Patented Jan. 19, 1954

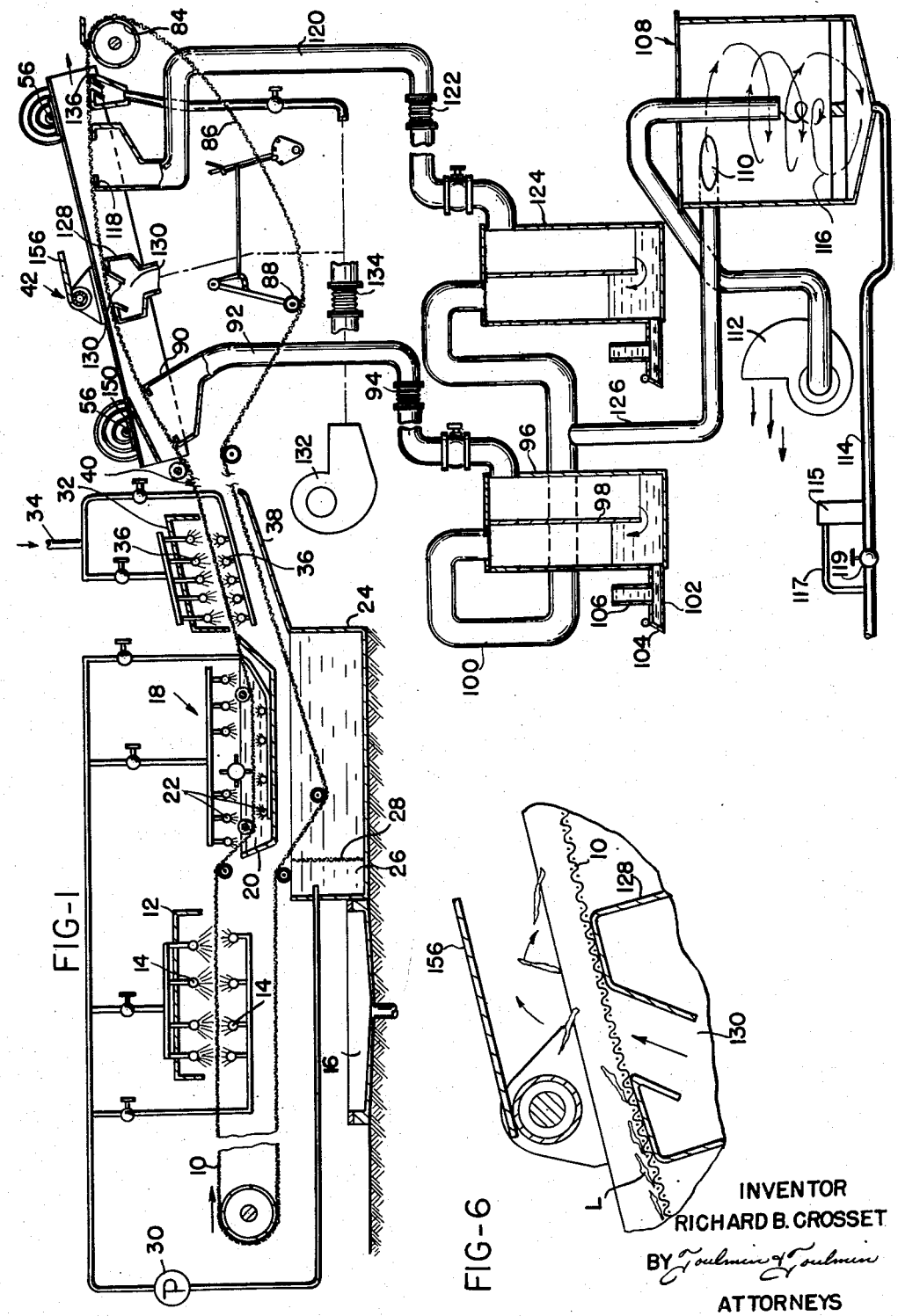

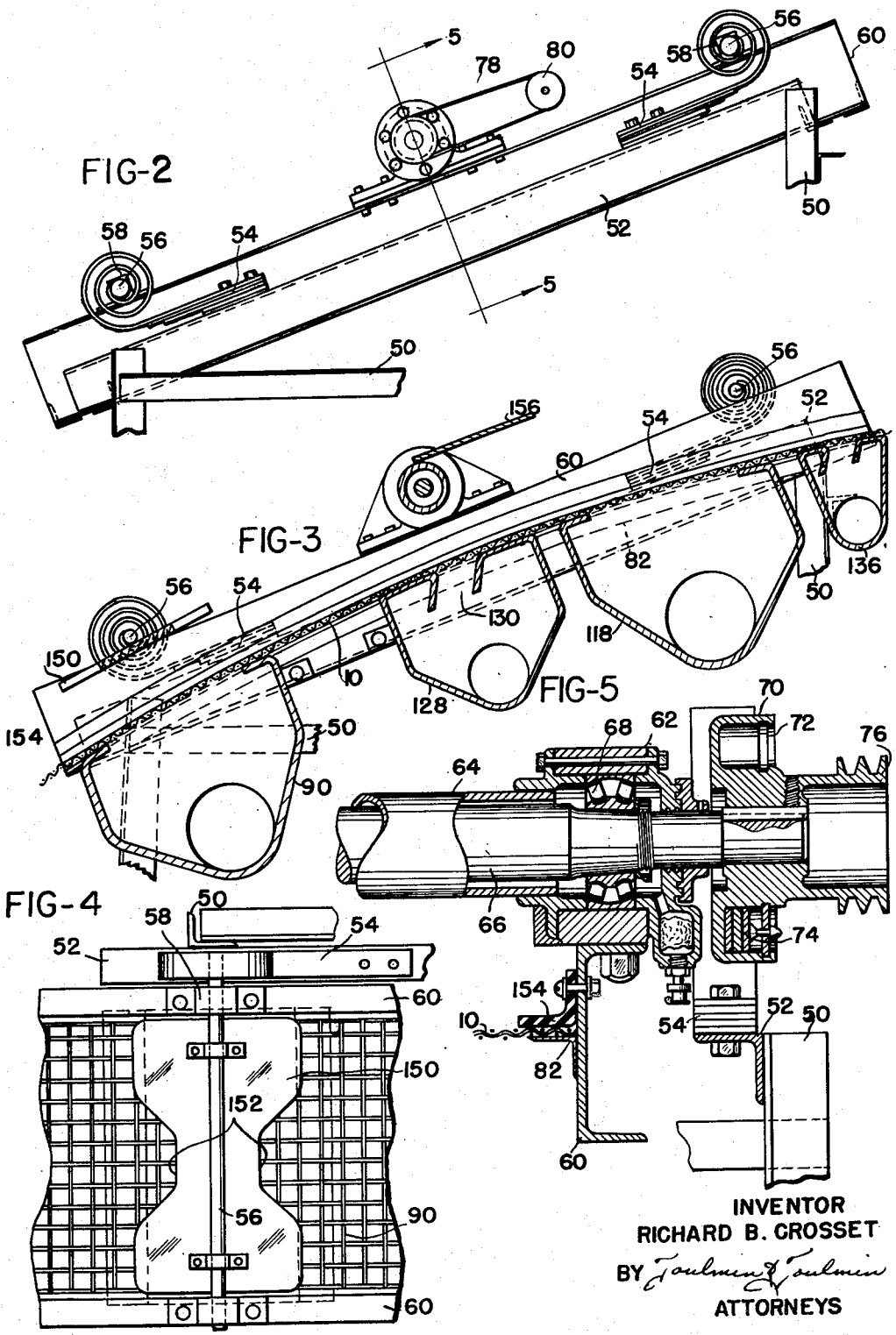

2,666,711

UNITED STATES PATENT OFFICE 2,666,711

METHOD AND APPARATUS FOR PROCESSING LEAFY VEGETABLES

Richard B. Crosset, Cincinnati, Ohio, assignor to The Crosset Company, Cincinnati, Ohio, a partnership Application September 20, 1951, Serial No. 247,531

19 Claims. (Cl. 99—204)

This invention relates to washing and drying devices for leafy vegetables, such as spinach, kale and the like, and to a method of operation of the device, particularly as regards the drying operation.

In the commercial processing of vegetables of the nature referred to, large volumes are handled and it is essential that vegetables be handled rapidly and efficiently in order to get them to markets at the proper time and in good condition. With spinach and kale, it is absolutely essential that they be properly washed so as to be clean when they are offered for purchase. This washing is done with water, and after the washing has been completed, the washed vegetables must be dried to a predetermined degree before being packaged or shipped to their point of sale.

Particularly with spinach, the washing and drying has always been difficult to carry out properly because heretofore it has been the practice to wash the spinach leaves and then to dry them in batches in centrifuges. The degree of drying desired can, of course, be accomplished in a centrifuge, but the leaves will vary widely in texture, hardness, and moisture content and it is difficult to process through a centrifuge without breaking or bruising, and as a result, centrifugally dried leaves are characterized in not being of as good a quality as desired.

With spinach, especially, when it is grown under conditions of warmth and adequate moisture, the leaves are quite delicate and are easily crushed or cracked, and at these points of injury, the leaf will bleed and present a very poor appearance, as well as creating a point where deterioration can commence.

When the spinach is grown under rather cold conditions, the leaves have a tendency to be quite hard and brittle, and while this does not detract in the value as a food, it makes the leaves quite easy to break, and with this type of growth an unusual amount of damage occurs to the leaves during their centrifuging.

Having the foregoing in mind, the present invention has, as the primary object, the provision of a method and apparatus for washing and drying leafy vegetables, such as spinach and kale, wherein the difficulties referred to above are avoided.

Another object is the provision of such a method and apparatus which will be extremely rapid in operation, thereby permitting large volumes of the vegetables to be processed.

A particular object is the provision of a method and apparatus of the nature described, characterized in that it is continuous in operation as opposed to former batch processes.

Still another particular object is the provision of a method and apparatus for drying leafy vegetables such as spinach and the like, which is rapid in operation, reduces the amount of moisture carried by the leaves to the desired amount and does not damage the leaves.

In general, the objects of this invention are attained by first washing the spinach by jets of water, and by submersion in water, then draining the loose moisture from the leaves, and then extracting the other moisture it is desired to remove by a combination of vibrations of the leaves and the application of a moving air stream.

According to the present invention, the vibration of the leaves is accomplished by vibrating a conveyor belt on which they are distributed while the air stream is created by applying a suction to the side of the conveyor belt opposite to that on which the leaves are placed, the said belt being perforated.

Damage is avoided by turning the leaves over on the conveyor by an air stream so that both sides of the leaves are subjected to the combination of vibrations and suction.

The several objects and advantages enumerated above, as well as other objects and advantages of this invention, will be more clearly understood upon reference to the following specification taken in connection with the accompanying drawings in which:

Figure 1 is a schematic view showing the arrangement of a washing and drying device according to my invention;

Figure 2 is a side elevational view of the vibrating and drying section of the machine;

Figure 3 is a longitudinal section through the vibrating and drying section;

Figure 4 is a plan view looking down on top of the conveyor at one of the suction heads of the vibrating and drying section, as represented by arrow 4 on Figures 2 and 3;

Figure 5 is a vertical section indicated by line 5—5 on Figure 2, showing the arrangement of the driven shaft by means of which the vibrator and drier are vibrated;

Figure 6 is a fragmentary sectional view of an intermediate point in the drier and vibrator section, showing the manner in which the leaves being treated are turned over.

In referring to the drawings in more detail, the arrangement shown in Figure 1 comprises a perforated conveyor belt 10, which may be, for example, a relatively open mesh wire screen through which air and water can freely pass, but also, the mesh is of such a size that the leaves will be adequately supported. Conveyor belt 10 moves in the direction of the arrow in Figure 1 and first conveys leaves distributed thereon through a chamber 12, comprising a plurality of jets of water 14 directed both upwardly and downwardly so as to spray both sides of the leaves. This station removes most of the loose and heavy soil carried by the leaves, and the water falling from the conveyor belt is drained by means of the sump 16.

From chamber 12, the conveyor belt passes to another washing chamber 18, wherein the conveyor belt is depressed by suitable idler rollers engaging the edge thereof so that it passes beneath the surface of the liquid in a tray 20. Within tray 20 are arranged both downwardly and upwardly acting water jets 22, and these water jets serve to remove further soil while the leaves are thoroughly soaked in the water, and thus, further soil, such as dry, hard earth is removed therefrom. The overflow from tray 20 falls into a sump 24, which has a compartment 26 at one end of it separated from the main part of the sump by the screen partition 28. Compartment 26 serves as a reservoir for supplying washing water to jets 14 and 22 by means of the pump 30. In this manner an economy of water is accomplished which materially reduces the cost of thoroughly washing the leaves.

After leaving station 18, the conveyor belt passes through a final washing station 32, and at which fresh, clean water is supplied through a supply pipe 34 leading to the upwardly and downwardly acting jets 36. The water which drains from the conveyor belt at this station is directed by drain board 38 to the sump 24.

After leaving station 32, the conveyor belt passes along a draining section indicated by the break at 40 in Figure 1, and during this travel a good deal of the moisture entrained on the leaves drains therefrom.

After a predetermined amount of travel, the conveyor belt enters a vibrating and drying section, generally indicated at 42, and wherein the conveyor belt is vibrated rapidly while at the same time a suction is applied to the underneath side of the conveyor belt which serves to remove the moisture which is displaced from the leaves by the vibration.

After leaving the vibrator and drying section, the leaves, which are now ready for sorting and packaging, are delivered to another conveyor belt or the like where the bad and defective leaves are removed and the leaves which are suitable for use are packaged or otherwise packed.

Referring now to the vibrating and drying section, this will best be seen in Figures 1 through 5, wherein it will be noted that there is provided a stationary frame 50 including a longitudinally extending angle 52. Adjacent each end of stationary angle 52 there is mounted a leaf spring 54 and extending between corresponding ones of these springs 54 in opposite sides of the frame 50 are the shafts 56. Shafts 56 are mounted in bearings or other suitable supports 58 that are rigidly mounted on the longitudinally extending channel members 60 that form the side members for the movable portion of the vibrator and drier section. These same members are suitably interconnected by transversely extending structural elements so as to make a rigid frame while at the same time leaving the frame open for the passage of the conveyor belt 10.

The vibration of the entire frame is accomplished by a vibrating device mounted on side members 60 at the center of the frame. This vibrator device comprises a pair of bearing brackets 62 mounted on channel members 60 and having extending therebetween a tube or sleeve 64 within which there is a shaft 66 journaled to its opposite ends on bearings 68 and said bearing brackets.

At each end of shaft 66 there is mounted a member 70 comprising an annular cavity 72 adapted for receiving weights 74. The weights 74 provide for an off-center mass so that when shaft 66 is driven, it will exert vibratory forces on the frame of the vibrator and drying section, which, due to the resilient support of the section provided by leaf springs 54, will cause the said frame to vibrate.

On one side of the frame, shaft 66 is provided with a pulley means 76, which may be belted by belts 79 with a motor driven pulley 80. By selecting a suitable speed of rotation and suitable support springs, the vibrator section can be made to vibrate at any desired amplitude and at any desired rate. I have found it satisfactory for the vibrator to move with an amplitude upon the order of from $\frac{1}{8}$ to $\frac{3}{16}$ of an inch on each side of its neutral position and at a rate of about 1000 cycles per minute.

The amplitude of vibration referred to above, and the rate of vibration are sufficient to cause water carried by the leaves in the form of little droplets to be shaken therefrom, or to be brought together so as to form larger droplets which will more easily drain from the leaves or more readily be drawn therefrom by an air stream, while at the same time, the leaves do not tend to bounce about on the conveyor belt and are not broken, crushed, or damaged in any other way.

As will be seen in Figures 1 and 3, the conveyor belt extends through the frame of the vibrator and drier section along an arcuate path, and this path is determined by the support angles 82 which are arcuately formed and which are mounted on the inside faces of the side channel members 60 of the vibrator frame. At the discharge end of the vibrator frame, the belt passes over the driven roller 84 and has a relatively long slack loop 86 formed therein engaged between adjustable idler roller 88. Due to the angular arrangement of the vibrator frame, its movement is in the form of a relatively flat orbit, having its major axis inclined upwardly and rightwardly as the frame is viewed in Figures 1 through 3. An unexpected advantageous result is obtained from this arrangement, inasmuch as it was found that the vibratory movement of the frame had a strong tendency to assist in the driving of the conveyor belt, and thus, materially to reduce the power requirements for actuating the conveyor belt. At the same time, no noticeable deterioration of the conveyor belt has occurred, probably due to the fact that the direction of vibration of the vibrator frame is such that it imposes no extreme longitudinal stress on the conveyor belt.

Arranged within the vibrator frame and engaging the underneath surface of the conveyor belt are a plurality of nozzles forming the means for withdrawing water from the vegetable leaves and for turning the leaves over on the belt.

At the left end of the vibrator frame, as it is viewed in the drawings, there is a nozzle 90 having an opening of substantial size immediately beneath the conveyor belt. This nozzle extends the width of the conveyor belt, as will be seen in Figure 4, and is connected by a conduit 92 through a flexible section 94 with a separator unit 96. Flexible section 94 is positioned relatively close to the vibrator frame and may consist of a fairly short length of rubber or other resilient and air-tight material, and provides the means whereby the nozzle 90 can be securely mounted in the vibrator frame to move therewith while the separator 96 is stationarily mounted on the floor adjacent the machine.

Separator unit 96 comprises an outer tank or inclosure having a baffle 98 therein and including a discharge conduit 100 on the side of the baffle opposite the side onto which conduit 92 opens. The bottom of the separator unit has a discharge pipe 102 normally closed by a pivoted gate 104, and a stand pipe 106 open to the atmosphere. The arrangement is such that the suction applied to conduit 100 will cause air to be drawn through the conveyor belt into nozzle 90 and then through conduit 92 into the separator unit and then around underneath the lower end of the baffle 98. By this arrangement most of the moisture entrained in the air in particle form is separated from the air by the separator unit, as well as the larger particles of the leaves and other particles of soil that may be drawn from the leaves. The provision of the stand pipe insures that there will be an adequate seal between the conduit 100 and the outside atmosphere so that the suction at nozzle 90 will not be broken. The separator unit can be cleaned at any time merely by opening door 104 and flushing out the interior of the unit.

Conduit 100 leads tangentially into the interior of a larger separator unit 108 through opening 110, which arrangement operates to cause the air drawn therein to move in a circular path and at high speed, whereby the air is made substantially dry and is entirely free from any particles of leaves or other material carried thereby. The suction side of blower 112 connects to the separator along the central axis to draw the air therefrom. A drain connection at 114 is supplied for draining separator 108, and the said separator may also include baffle means as at 116 which operate to prevent the water that accumulates in the separator from spinning about and thereby exposing the drain opening to the suction created within the separator. Connection 114 leads to drain via standpipe 115 having overflow 117 bypassing normally closed valve 119. The standpipe provides a fluid seal between the atmosphere and the suction of blower 112 and valve 119 can be opened to flush out the separator when necessary.

Returning now to the vibrator section, there is arranged at the opposite end thereof from nozzle 90, a similar nozzle 118 connected through a conduit 120 that includes a flexible section 122 with a separator unit 124 and which also has a connection as by conduit 126 with the conduit 100 leading to separator 108.

Intermediate nozzles 90 and 118 is an additional nozzle 128 characterized in having an angularly directed nozzle opening 130, and which is a pressure nozzle rather than a suction nozzle. Air may be supplied to pressure nozzle 128 as by a blower 132 discharging through a flexible connection 134.

At the extreme right end of the vibrator section there is a nozzle 136 also supplied by blower 132 and which is operable for blowing the leaves off the conveyor belt on to another conveyor belt or some suitable receiver from which the leaves are taken to the sorting and packaging station.

It has been found that with the rate of vibration of the vibrator frame referred to, a suction at nozzles 90 and 118 on the order of from six to twelve inches of water produces the best results. For the treatment of kale, the lower suction is the better, while for spinach, the higher suction is generally employed, with an eight-inch suction representing a good average rate. With suction on the order referred to, there is a considerable amount of air drawn into the nozzle and with nozzle 90 at the inclined entrance end of the vibrator section, this suction creates sufficient movement of air that it has a tendency to prevent the leaves from moving into the vibrator section. This comes about because of the movement of air upwardly through the conveyor belt on its approach to the vibrator section.

By extensive tests and experimentation, however, I have discovered that by applying a suitable baffle above the nozzle 90, the air-flow into the nozzle can be so directed so as not only to permit the leaves to move up the inclined approach to the vibrator section, but actually to be distributed uniformly over the conveyor belt whereby the best moisture removing conditions obtain.

Such a baffle is illustrated in Figures 1, 3 and 4 and comprises a member 150 generally centrally located over the nozzle opening at a distance therefrom and having cut-outs as at 152 along its opposite edges. This baffle is so adjusted that as the vegetable leaves approach the drier section at predetermined points, they are actually lifted from the conveyor belt and conveyed by the air to a point over the nozzle opening and at which point they are deposited again on the conveyor belt. Inasmuch as the air has a tendency to pass through the conveyor belt at exposed portions thereof, this action has a tendency to distribute the leaves uniformly over the conveyor belt and the disposition of the leaves by this arrangement is much more rapid and more uniform than could be obtained by any other mechanical or manual arrangement.

With the leaves so positioned on the conveyor belt over the nozzle 90, the vibration of the conveyor belt will dislodge water therefrom in the described manner, and this water will be taken up by the air stream flowing into the nozzle.

The edge of the conveyor belt as it passes through the vibrator frame can advantageously be sealed by the rubberlike stripping 154, which prevents loss of air about the edge of the conveyor belt.

After the leaves have passed beyond the influence of suction nozzle 90, it is desired to turn them over on the conveyor belt for the drying of the other side. This is accomplished by the angularly directed nozzle 130 which functions in the manner represented in Figure 6. As the leaves, indicated by letter L, approach nozzle 130, they are lifted up by the air stream issuing therefrom and then turned over and are again disposed on the conveyor belt in a perfectly uniform pattern. I have found it advantageous to provide a baffle member 156 mounted above nozzle 130 and which so deflects the air stream therefrom that the picking up and turning over of the leaves is substantially a positive and precise operation with the leaves being inverted and falling onto the conveyor in as uniform a pattern as they had when they passed over suction nozzle 90.

The leaves are then blown from the end of the conveyor by nozzle 136 and are in a condition of uniform dryness of the desired degree on both sides and are ready for sorting and packaging. The leaves are characterized by very little breakage and very little crushing, and are thus in prime condition for obtaining the best prices on the market and for giving the consumer the best possible produce.

It will be noted that the operation of the apparatus according to this invention, is continuous as to all phases and that it is only necessary to supply the leaves to be treated at the proper rate to the receiving end of the conveyor and to receive the washed leaves from the discharge end of the conveyor.

Suitable valve means are, of course, provided for regulating the pressures of the various water jets and the pressures and suctions associated with the various nozzles in drier section. These valves may take any suitable form and are diagrammatically illustrated in the drawings.

It will be understood that this invention is susceptible to modification in order to adapt it to different usages and conditions and, accordingly, it is desired to comprehend such modifications within this invention as may fall within the scope of the appended claims.

I claim:

1. In an apparatus for washing and drying leafy vegetables, a perforated conveyor belt, means for feeding leafy vegetables to said belt, a washing station through which the conveyor belt passes for removing soil from said leafy vegetables, a frame beyond the washing station engaging the edges of said conveyor belt, a pair of suction nozzles engaging the underneath side of said belt within said frame for retaining and drying the moisture on the leafy vegetables while being carried by said belt, means resiliently supporting said frame, means for oscillating said frame whereby the leafy vegetables are continuously shaken, said suction nozzles being spaced apart, and a pressure nozzle communicating with the underneath side of said conveyor belt between said suction nozzles and directing air upwardly through said belt onto said leafy vegetables as they pass thereover.

2. In an apparatus for washing and drying leafy vegetables, a perforated conveyor belt and means for feeding leafy vegetables to said belt, a washing station through which the conveyor belt passes for cleaning said leafy vegetables, a frame beyond the washing station engaging the edges of said conveyor belt, a pair of suction nozzles engaging the underneath side of said belt within said frame for retaining the leafy vegetables on said belt and for removing moisture from said leafy vegetables, means resiliently supporting said frame, means for vibrating said frame for shaking water from said leafy vegetables, said suction nozzles being spaced apart, a pressure nozzle communicating with the underneath side of said conveyor belt between said suction nozzles for blowing air upwardly against said leafy vegetables, blower means connected with said nozzles, and flexible connections disposed between the blower means and the nozzles for permitting vibration of the nozzles with the frame.

3. In a drier arrangement for vegetable leaves; a perforated conveyor belt, suction nozzles communicating with the underneath side of the conveyor belt at spaced points therealong, and a pressure nozzle communicating with the underneath side of the conveyor belt at a point between said suction nozzles, said pressure nozzle being angularly directed relative to and in the direction of movement of said conveyor belt for turning over on the belt the articles being conveyer thereby, a baffle disposed over the said pressure nozzle for controlling the air flow therefrom, thereby to limit the movement of the articles being turned over by the air stream from the pressure nozzle said baffle and pressure nozzle lying on opposite sides of said belt, said nozzles and the conveyor belt extending thereover being supported in a vibratory frame and means for vibrating said frame.

4. A drier section for a washing and drying apparatus for leafy vegetables comprising; an inclined frame, a perforated conveyor belt extending upwardly at an angle into said frame for conveying leafy articles to be dried therethrough, means for feeding leafy vegetables to said belt means for oscillating said frame to thereby oscillate that portion of the belt and the leafy vegetables thereon passing through said frame, suction nozzles communicating with the underside of said belt and being positioned adjacent the areas of ingress and egress of the belt relative to the frame for drying and retaining said leafy vegetables on said belt, a pressure nozzle communicating with said belt and being positioned intermediate said suction nozzles for blowing air upwardly against said leafy vegetables, baffle plates mounted above said ingress nozzle and said pressure nozzle, said belt lying between said baffles and nozzles so that air flow through said belt will be influenced by the combined action of the nozzle and its corresponding baffle, the air flow from said suction nozzles being directed substantially perpendicular to said belt and the air flow from said pressure nozzle being directed at an angle relative to and in the direction of movement of said belt whereby leafy vegetables on said belt will be turned over under the influence of the air currents created by said pressure nozzle and its associated baffle.

5. A drier section for washing and drying leafy vegetables comprising; a stationary structure, an inclined frame and means for resiliently mounting said frame on said structure, a perforated conveyor belt, means for feeding leafy vegetables to said belt means on said frame for guiding said belt in an arcuate path therethrough, a suction nozzle communicating with the underside of said belt adjacent the place where said belt enters the frame for drying and retaining said leafy vegetables on said belt and a baffle positioned above said nozzle on the opposite side of said belt for controlling air currents whereby to aid in moving said leafy vegetables along with said belt, a pressure nozzle communicating with the underside of said belt substantially midway of said frame for blowing air upwardly against said leafy vegetables and a second baffle positioned above said pressure nozzle on the opposite side of said belt, said suction nozzle being substantially perpendicular to the belt, said pressure nozzle lying at an acute angle relative to said belt and being directed so as to blow air in the direction of movement of said belt whereby said leafy vegetables will be turned over under the influence of the air currents created by said pressure nozzle and its associated baffle.

6. A drier section for washing and drying leafy vegetables comprising; a stationary structure, an inclined frame and means for resiliently mounting said frame on said structure, means centrally mounted on said frame for oscillating the frame relative to said stationary structure and comprising a rotating shaft having an off-center mass disposed in either end thereof, a perforated conveyor belt, means for feeding leafy vegetables to said belt means on said frame for guiding said belt in an arcuate path therethrough, a suction nozzle communicating with the underside of said belt adjacent the place where said belt enters the frame for retaining and drying said leafy vegetables on the belt as they are oscillated with said frame and a baffle positioned above said nozzle on the opposite side of said belt for creating a component of air flow to assist in moving said leafy vegetables on said belt, a pressure nozzle communicating with the underside of said belt substantially midway of said frame and a second baffle positioned above said pressure nozzle on the opposite side of said belt, said suction nozzle being substantially perpendicular to the belt, said pressure nozzle lying at an acute angle relative to said belt and being directed in the direction of movement of said belt whereby in combination with said second baffle an air blast is created for turning said leafy vegetables over on said belt.

7. A drier section for washing and drying leafy vegetables comprising; an inclined frame, a perforated conveyor belt extending upwardly at an angle into said frame for conveying leafy vegetables to be dried therethrough, means for feeding leafy vegetables to said belt means for oscillating said frame to thereby oscillate that portion of the belt and the leafy vegetables thereon passing through said frame, suction nozzles communicating with the underside of said belt and being positioned adjacent the areas of ingress and egress of the belt relative to the frame for drying said leafy vegetables and retaining them on said belt, a pressure nozzle communicating with said belt and being positioned intermediate said suction nozzles for blowing air upwardly on said leafy vegetables, baffle plates mounted above said ingress nozzle and said pressure nozzle, said belt lying between said baffles and nozzles so that air flow through said belt will be influenced by the combined action of the nozzle and its corresponding baffle, the air flow from said suction nozzles being directed substantially perpendicular to said belt and the air flow from said pressure nozzle being directed at an angle relative to and in the direction of movement of said belt, whereby said leafy vegetables will be turned over on said belt, and a second pressure nozzle located adjacent said egress area for blowing the leafy vegetables off said conveyor belt.

8. A method of processing leafy vegetables in a continuous system through washing and drying steps comprising; supporting the leafy vegetables on a perforated conveyor, passing the leafy vegetables on a conveyor through a washing station, subjecting said leafy vegetables in the station to the action of water to remove and dislodge soil therefrom, passing the washed leafy vegetables on the conveyor on through a multi-stage drying section in which the leafy vegetables are continuously subjected to an oscillating vibration, simultaneously with said oscillating alternately subjecting said leafy vegetables to suction and pressure, and discharging the leafy vegetables from the conveyor.

9. A method of processing leafy vegetables in a continuous system through washing and drying steps comprising; supporting the leafy vegetables on a perforated conveyor, passing the leafy vegetables on a conveyor through a washing station, subjecting said leafy vegetables in the station to the action of water to remove and dislodge soil therefrom, passing the washed leafy vegetables on the conveyor on through a multi-stage drying section in which the leafy vegetables are continuously subjected to an oscillating vibration, sucking moisture from the leafy vegetables in a first stage, blowing the leafy vegetables upwardly in a second stage, and again applying suction to the leafy vegetables in a third stage and discharging the leafy vegetables from the conveyor.

10. A method of drying leafy vegetables comprising; arranging the leafy vegetables on a perforated conveyor, moving the leafy vegetables on the conveyor through a drying station and in the direction of the conveyor, imparting a vertical oscillatory force to the leafy vegetables continuously as they pass through the drying station, applying a suction to the underneath side of the leafy vegetables during said oscillatory movement for drying said leafy vegetables and for maintaining their movement along the conveyor.

11. A method of drying leafy vegetables following a washing process comprising; distributing the leafy vegetables on a perforated conveying system, moving the leafy vegetables on the conveyor in the direction of its length, oscillating the conveyor in a direction at an angle to the direction of its length, applying a suction to the underneath side of the oscillating conveyor at spaced points therealong for retaining and drying the leafy vegetables on said conveyor, blowing air upwardly through the conveyor at a point intermediate the said spaced points for turning the leafy vegetables over on the conveyor between the two said points to dry the leafy vegetables on both sides thereof.

12. A method of drying leafy vegetables following a washing process comprising; distributing the leafy vegetables on a perforated conveying system, moving the leafy vegetables on the conveyor in the direction of its length, oscillating the conveyor in a direction at an angle to the direction of its length, applying a suction to the underneath side of the oscillating conveyor at spaced points therealong for retaining and drying the leafy vegetables on said conveyor, blowing air upwardly through the conveyor at a point intermediate the said spaced points for turning the leafy vegetables over on the conveyor between the two said points to dry the leafy vegetables on both sides thereof, the rate of oscillation being on the order of 1000 cycles per minute.

13. A method of drying leafy vegetables following a washing process comprising; distributing the leafy vegetables on a perforated conveying system, moving the leafy vegetables on the conveyor in the direction of its length, oscillating the conveyor in a direction at an angle to the direction of its length, applying a suction to the underneath side of the oscillating conveyor at spaced points therealong for retaining and drying the leafy vegetables on said conveyor, blowing air upwardly through the conveyor between the two said points to dry the leafy vegetables on both sides thereof, the rate of oscillation being on the order of 1000 cycles per minute, and the amplitude of said oscillations being on the order of $\frac{3}{16}$-inch on either side of a neutral position.

14. An apparatus for drying leafy vegetables comprising; a frame comprising spaced side rails, a stationary structure, means comprising springs mounted at opposite sides and at opposite ends of said frame for resiliently supporting the frame on said structure, a perforated conveyor belt and means for feeding the leafy vegetables to said belt, arcuate guide means for the inner faces of said side members for guiding said perforated conveyor belt and thereby said leafy vegetables through the frame, spaced suction nozzles in the frame for enging the underneath side of the conveyor belt and for drawing moisture from said leafy vegetables, a shaft extending transversely across the frame intermediate the ends thereof and including an off-center weight, and means for driving said shaft thereby causing said frame to oscillate on its resilient support whereby said leafy vegetables are subjected to an oscillatory movement to aid the drying thereof while passing through said frame.

15. An apparatus for drying leafy vegetables comprising; a frame comprising spaced side rails, a stationary structure, means comprising springs mounted at opposite sides and at opposite ends of said frame for resiliently supporting the frame on said structure, a perforated conveyor belt and means for feeding the leafy vegetables to said belt, arcuate guide means for the inner faces of said side members for guiding said perforated conveyor belt and thereby said leafy vegetables through the frame, spaced suction nozzles in the frame for engaging the underneath side of the conveyor belt and for drawing moisture from said leafy vegetables, a shaft extending transversely across the frame intermediate the ends thereof and including an off-center weight, and means for driving said shaft thereby causing said frame to oscillate on its resilient support whereby said leafy vegetables are subjected to an oscillatory movement to aid the drying thereof while passing through said frame, said frame being inclined at an angle whereby said oscillatory movement takes place at an angle extending diagonally to said conveyor belt.

16. In a drier section for drying leafy vegetables; a stationary structure, a frame in the structure comprising spaced side members, means at opposite ends of said side members and at opposite sides of the frame for resiliently supporting the frame on the structure, a perforated conveyor belt and means for feeding leafy vegetables to said belt, arcuate guide means on the inside faces of said side members for engaging the edges of said perforated conveyor belt, said frame being inclined upwardly in the direction of movement of said belt, a suction nozzle at each end of the frame for engaging the underneath side of the conveyor belt and for drawing moisture from and retaining said leafy vegetables on said belt, a pressure nozzle at an intermediate point of the frame engaging the underneath side of the belt for blowing air upwardly on the leafy vegetables, a shaft extending transversely of the frame above said belt at an intermediate point thereon and journalled on the frame, said shaft including off-center masses at its opposite ends, and means for driving said shaft for oscillating said frame whereby said leafy vegetables are subjected to an oscillatory movement while under the influence of said suction and pressure nozzles.

17. In a drier arrangement for leafy vegetables; an inclined frame, a perforated conveyor belt extending upwardly at an angle and into said frame for conveying leafy vegetables to be dried thereto, means for oscillating the frame thereby to oscillate the portion of the conveyor belt carried by the frame and thereby to oscillate said leafy vegetables, a suction nozzle in the frame engaging the underneath side of the conveyor belt adjacent the point where the conveyor belt enters the frame for drawing moisture from said leafy vegetables, and a baffle mounted in the frame and disposed over the said nozzle for attaining a component in the air flow to said nozzle in the direction of movement of the conveyor belt to assist in the movement of the leafy vegetables to be dried into the frame, said belt lying between said baffle and nozzle.

18. In a drier arrangement for leafy vegetables; a perforated conveyor belt, means for feeding leafy vegetables to said belt, suction nozzles communicating with the underneath side of the conveyor belt at spaced points therealong for retaining the leafy vegetables on the belt and for drying thereof, a pressure nozzle communicating with the underneath side of the conveyor belt at a point between said suction nozzles, the air flow from said pressure nozzle being angularly directed relative to the direction of movement of said conveyor belt for turning over on the belt the leafy vegetables being conveyed thereby.

19. In a drier arrangement for drying leafy vegetables; a perforated conveyor belt, means for feeding leafy vegetables to said belt, suction nozzles communicating with the underneath side of the conveyor belt at spaced points therealong for retaining said leafy vegetables on the belt and for drying thereof, a pressure nozzle communicating with the underneath side of the conveyor belt at a point between said suction nozzles, the air flow from said pressure nozzle being angularly directed relative to and in the direction of movement of said conveyor belt for turning over on the belt the leafy vegetables being conveyed thereby, a baffle disposed over the said pressure nozzle for controlling the air flow therefrom, thereby to limit the movement of the articles being turned over by the air stream from the pressure nozzle, said belt lying between said pressure nozzle and baffle.

RICHARD B. CROSSET.

References Cited in the file of this patent

UNITED STATES PATENTS

| Number | Name | Date |
|---|---|---|
| 923,547 | Mayo | June 1, 1909 |
| 1,014,027 | Walter | Jan. 9, 1912 |
| 1,169,682 | Sargent | Jan. 25, 1916 |
| 1,674,064 | Ridley | June 19, 1928 |
| 1,681,556 | Parker | Aug. 21, 1928 |
| 1,884,344 | Stevens | Oct. 25, 1932 |
| 1,937,851 | Stansbury | Dec. 5, 1933 |
| 1,964,275 | Secondo | June 26, 1934 |
| 2,083,445 | Hellborg | June 8, 1937 |
| 2,157,716 | Muller | May 9, 1939 |
| 2,214,981 | Vissac | Sept. 17, 1940 |

FOREIGN PATENTS

| Number | Country | Date |
|---|---|---|
| 439,638 | Great Britain | Dec. 11, 1935 |
| 766,869 | France | Apr. 23, 1934 |
| 635,560 | Germany | Oct. 7, 1936 |